(12) United States Patent
Suzuki

(10) Patent No.: US 9,050,926 B2
(45) Date of Patent: Jun. 9, 2015

(54) VEHICLE HEADLAMP AND VEHICLE HEADLAMP DEVICE

(71) Applicant: Ichikoh Industries, Ltd., Isehara-shi, Kanagawa-ken (JP)

(72) Inventor: Yasufumi Suzuki, Isehara (JP)

(73) Assignee: ICHIKOH INDUSTRIES, LTD., Isehara-shi (JP)

( * ) Notice: Subject to any disclaimer, the term of this patent is extended or adjusted under 35 U.S.C. 154(b) by 164 days.

(21) Appl. No.: 13/754,356

(22) Filed: Jan. 30, 2013

(65) Prior Publication Data
US 2013/0201710 A1 Aug. 8, 2013

(30) Foreign Application Priority Data
Feb. 2, 2012 (JP) .................. 2012-020871

(51) Int. Cl.
- *B60Q 1/04* (2006.01)
- *F21S 8/10* (2006.01)
- *B60Q 1/08* (2006.01)
- *B60Q 1/24* (2006.01)

(52) U.S. Cl.
CPC .............. *B60Q 1/04* (2013.01); *F21S 48/1768* (2013.01); *B60Q 1/085* (2013.01); *B60Q 1/24* (2013.01); *F21S 48/1159* (2013.01); *F21S 48/1388* (2013.01); *F21S 48/1742* (2013.01); *F21S 48/1757* (2013.01); *F21S 48/1773* (2013.01); *B60Q 2300/056* (2013.01); *B60Q 2300/41* (2013.01); *B60Q 2300/42* (2013.01)

(58) Field of Classification Search
CPC ..... F21S 48/1773; F21S 48/145; F21S 48/14; F21S 48/1705; F21S 48/1752; F21S 48/1763; F21S 48/1768
USPC .......................... 362/512, 513, 539, 465, 466
See application file for complete search history.

(56) References Cited

U.S. PATENT DOCUMENTS

| | | | |
|---|---|---|---|
| 7,665,872 B2 * | 2/2010 | Nakabayashi | 362/545 |
| 7,896,512 B2 | 3/2011 | Tatara et al. | |
| 8,277,096 B2 * | 10/2012 | Rampf | 362/464 |
| 8,297,814 B2 * | 10/2012 | Tanaka et al. | 362/539 |
| 8,425,097 B2 * | 4/2013 | Yamamoto | 362/539 |
| 2009/0086500 A1 | 4/2009 | Tatara et al. | |

FOREIGN PATENT DOCUMENTS

JP 2009-087811 A 4/2009

* cited by examiner

*Primary Examiner* — Peggy Neils
(74) *Attorney, Agent, or Firm* — Foley & Lardner LLP

(57) ABSTRACT

The present invention includes a lamp unit for low beam and a lamp unit for high beam. A respective one of the lamp units is made of: a semiconductor-type light source; and a reflector that has reflection surfaces configured to emit forward of a vehicle a light from the semiconductor-type light source, as a predetermined light distribution pattern. As a result, the present invention is capable of fully utilizing the light from the semiconductor-type light source and facilitating a light distribution design for forming the light in a predetermined light distribution pattern.

4 Claims, 13 Drawing Sheets

VEHICLE HEADLAMP AND VEHICLE HEADLAMP DEVICE

CROSS REFERENCE TO RELATED APPLICATIONS

This application claims priority of Japanese Patent Application No. 2012-020871 filed on Feb. 2, 2012. The contents of the application are incorporated herein by reference in their entirety.

BACKGROUND OF THE INVENTION

1. Field of the Invention

The present invention relates to a vehicle headlamp configured to illuminate a multifunctional light distribution patterns forward of a vehicle. In addition, the present invention relates to a vehicle headlamp device that is provided with a vehicle headlamp configured to illuminate multifunctional light distribution patterns forward of a vehicle.

2. Description of the Related Art

A vehicle headlamp and a vehicle headlamp device of such a type (hereinafter, referred to as a "vehicle headlamp system) are conventionally known (for example, Japanese Unexamined Patent Application Publication No. 2009-87811). Hereinafter, a conventional vehicle headlamp system will be described. The conventional vehicle headlamp system is provided with: a main lamp unit; a projector type first subsidiary lamp unit of a projector type; and a second subsidiary lamp unit of a lens direct emission and light distribution type, each of which employs a semiconductor light emitting element as a light source. Multifunctional light distribution patterns can be obtained by turning on or off the light source of the main lamp unit, turning on or off the semiconductor light emitting element that serves as the first subsidiary lamp unit or turning on or off the semiconductor light emitting element that serves as the second lamp unit.

However, the conventional vehicle headlamp system described previously uses the first subsidiary lamp unit of the projector type; and therefore, there has been a case in which light from the semiconductor light emitting element is reflected on a reflection surface of a reflector and then shaded by means of a base member when the reflected light substantially converges in proximity to a focal point on a rear side of a projection lens. Therefore, there has been a case in which the light from the semiconductor light emitting element cannot be hilly utilized. In addition, the conventional vehicle headlamp system described previously uses the second subsidiary lamp unit of the lens direct emission and light distribution type; and therefore, a light distribution design configured to form the light from the semiconductor light emitting element in a predetermined light distribution pattern by means of the projection lens is prone to be cumbersome.

SUMMARY OF THE INVENTION

The present invention has been made in order to the above described problem that there has been the case in which the light from the semiconductor light emitting element is not fully utilized, and the light distribution design configured to form the emitted light in the predetermined light distribution pattern is prone to be cumbersome in conventional vehicle headlamp systems.

A vehicle headlamp according to first aspect of the present invention, comprising:

a lamp unit for low beam configured to emit forward of a vehicle a light distribution pattern for low beam;

a lamp unit for high beam configured to emit forward of the vehicle a light distribution pattern for high beam;

a shade that is disposed so as to be movable between a first location and a second location, and is configured to maintain the light distribution pattern for high beam when the shade is positioned in the first location and to form a light distribution pattern for shoulder edge beam in a state in which a part of the light distribution pattern for high beam is shaded when the shade is positioned in the second location; and a shade switching device configured to position the shade so as to be movably switchable between the first location and the second location, wherein a respective one of the lamp unit for low beam and the lamp unit for high beam are made of a semiconductor-type light source and a reflector that has a reflection surface configured to emit forward of the vehicle the light from the semiconductor-type light source, as the light distribution pattern for low beam, the light distribution pattern for high beam, and the light distribution pattern for shoulder edge beam that is formed in a state in which the part of the light distribution pattern for high beam is shaded.

The vehicle headlamp according to second aspect of the present invention, in the first aspect, wherein the lamp unit for low beam and the lamp unit for high beam are integrally configured so as to be rotatable around a vertical axis by means of a swivel device.

The vehicle headlamp according to third aspect of the present invention, in the second aspect, wherein the vertical axis of the swivel device passes through a center or a substantial center of the lamp unit for low beam.

A vehicle headlamp device according to fourth aspect of the present invention, comprising:

the vehicle headlamp according to the first aspect to third aspect;

a detecting portion configured to detect whether or not a preceding vehicle or an opposite vehicle forward of a driving vehicle exists; and a control portion configured to output a control signal to the semiconductor-type light source and the shade switching device or the semiconductor-type light source and the shade switching device and the swivel device, based on a detection signal from the detecting portion.

The vehicle headlamp according to the first aspect of the present invention uses a lamp units of a reflector reflection and light distribution type as the lamp unit for low beams and the lamp unit for high beam. Thus, in comparison with a lamp unit of a projector type, light from the semiconductor-type light source can be sufficiently effectively utilized. In addition, in comparison with a lamp unit of a lens direct reflection and light distribution type, a light distribution design is simply made in such a manner that the light from the semiconductor-type light source is formed in predetermined light distribution patterns by means of the reflection surface of the reflector.

Further, the vehicle headlamp according to the first aspect of the present invention is a light distribution pattern of multiple functions obtained by turn on and off on the light of the semiconductor-type light source for the lamp unit for low beam, and turn on and off on the light of the semiconductor-type light source for the lamp unit for high beam, and stopping of driving of the shade switching device.

The vehicle headlamp according to the second aspect of the present invention, can be directed the light distribution pattern of the many functions in a horizontal direction (a transverse direction) by the swivel device. So the light distribution pattern of the many functions can be obtained. In particular, it is possible to direct in the horizontal direction light distribution pattern for low beam in the horizontal direction, the vehicle headlamp can be in the turning direction to improve visibility when driving track path (curves) and contributes to safe driving.

The vehicle headlamp according to the third aspect of the present invention, the vertical axis of the swivel device passes through a center or a substantial center of the lamp unit for low beam. Therefore, the vehicle headlamp can be reduce the deformation of the light distribution pattern for low beam when the light distribution pattern for low beam directed in the horizontal direction by the swivel device.

The vehicle headlamp device according to the fourth aspect of the present invention, can achieve a similar effect with the vehicle headlamp according to any one of the first aspect to third aspect by means for solving the problems described above.

DESCRIPTION OF THE PREFERRED EMBODIMENTS

Figure 2:
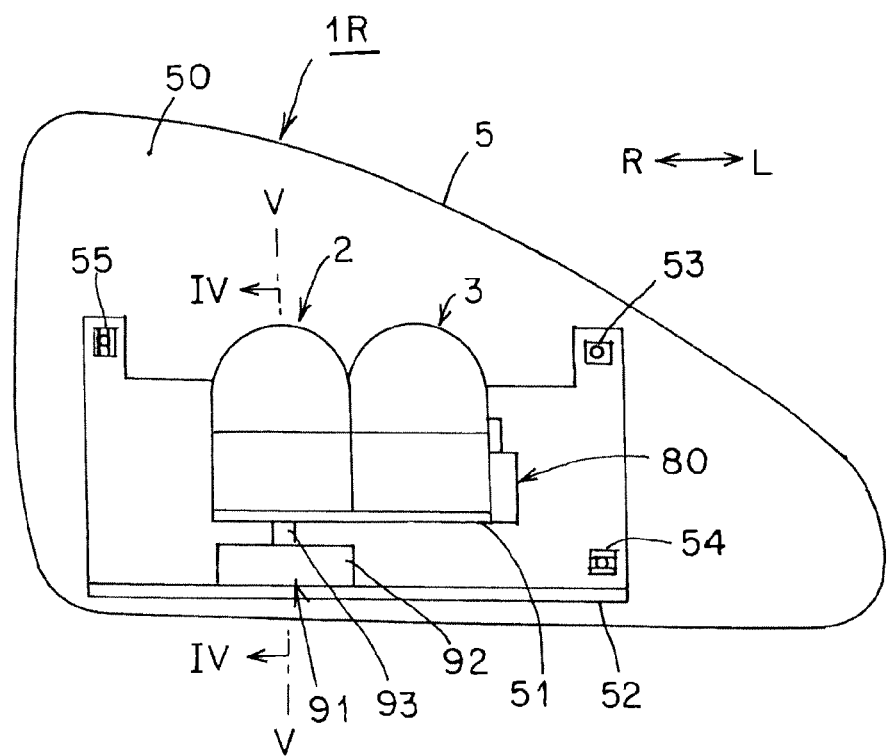
FIG. 2 is a front view showing the essential constituent elements of a right side lamp unit.
Figure 3:
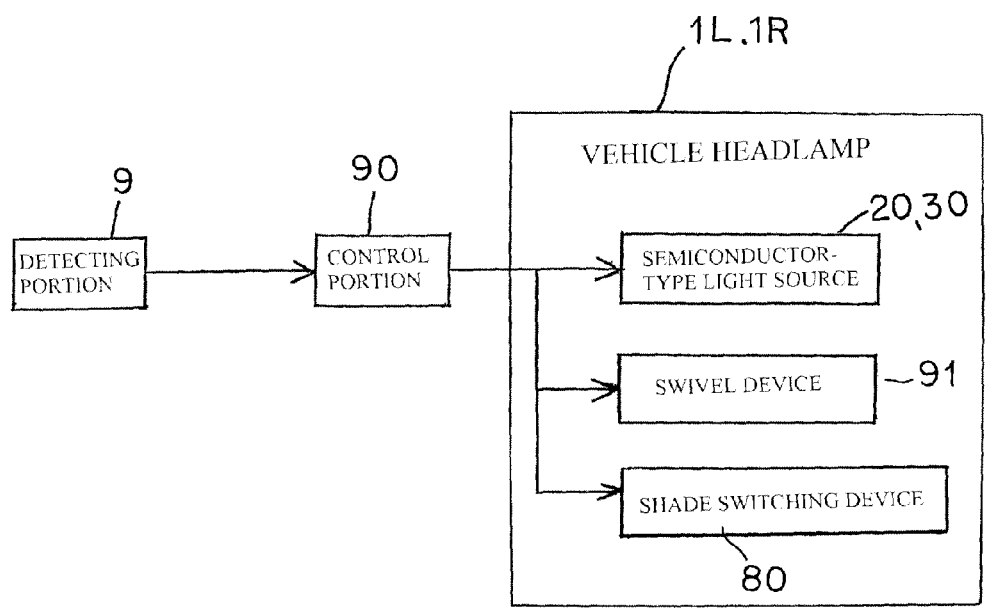
FIG. 3 is a block diagram depicting the constituent elements of a vehicle headlamp device.

Hereinafter, two examples of the preferred embodiments (exemplary embodiments) of a vehicle headlamp system according to the present invention will be described in detail with reference to the drawings. It is to be noted that the present invention is not limited by the embodiments. In FIG. 2, reference code R designates a right side, and reference code L designates a left side, respectively. In FIG. 7 to FIG. 12, reference code VU-VD designates a vertical line from the top to bottom of a screen. Reference code HL-HR designates a horizontal line from the left to right of the screen. In the present specification and the claimed attached herewith, the terms "front" "rear", "top", "bottom", "left", and "right" respectively designate the front, rear, top, bottom, left, and right to be defined when the vehicle headlamp according to the present invention is mounted on a vehicle.

(Configuration of First Embodiment)

Figure 1:
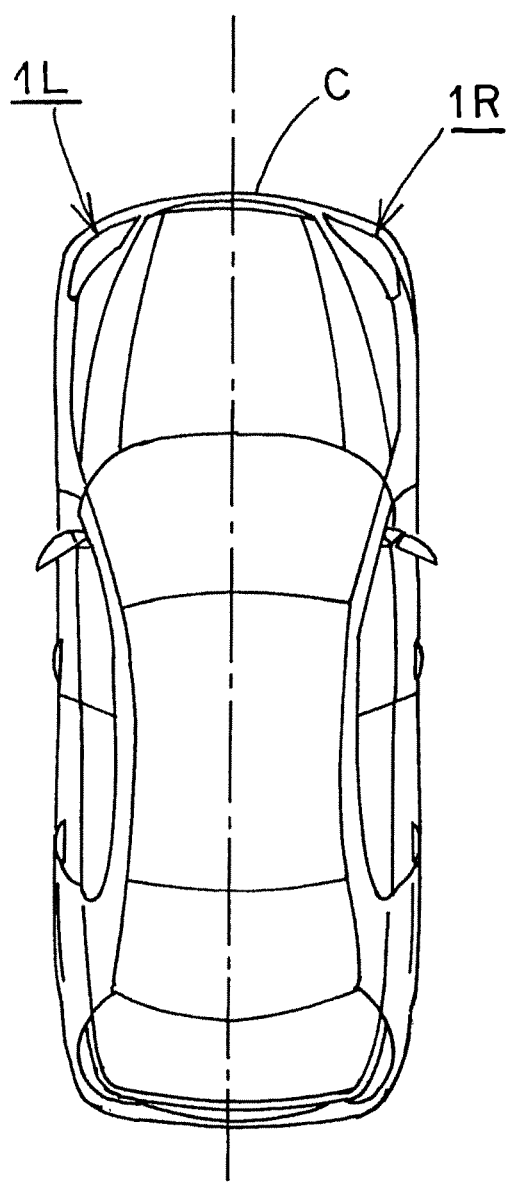
FIG. 1 shows a first embodiment of a vehicle headlamp system according to the present invention, and a plan view of a vehicle having vehicle headlamps mounted on both of the left and right sides of the vehicle.

Each of FIG. 1 to FIG. 18 shows a first embodiment of a vehicle headlamp system according to the present invention. Hereinafter, a configuration of the vehicle headlamp system according to the first embodiment will be described. In FIG. 1, reference numerals 1L and 1R designate vehicle headlamps according to the first embodiment (such as headlamps, for example). The vehicle headlamps 1L and 1R are mounted on both of the left and right end parts of a front portion of a vehicle C for left side driving). Hereinafter, a right side vehicle headlamp 1R to be mounted on the right side of the vehicle C will be described. It is to be noted that the left side vehicle headlamp 1L to be mounted on the left side of the vehicle C is made of the constituent elements that are substantially identical to those of the right side vehicle headlamp 1R; and therefore, its related description is omitted hereinafter.

(Vehicle headlamp 1R (1L))

The vehicle headlamp 1R (1L) described previously, as shown in FIG. 2, is provided with: a lamp unit 2 for low beam;

a lamp unit 3 for high beam; a shade 8, a shade switching device 80; a swivel device 91; a dimming control portion (refer to a control portion 90 in FIG. 3); a first mount member (a heat sink member) 51 and a second mount member (a bracket) 52; an optical axis adjustment devices 53, 54, and 55; a lamp housing 5; and a lamp lens (such as a through outer lens, for example).

The lamp unit 2 for low beam, the lamp unit 3 for high beam, the shade 8, the shade switching device 80, the swivel device 91, the dimming control portion, the first mount member 51, the second mount member 52, and the optical axis adjustment devices 53, 54, and 55 are disposed in a lamp room 50 that is partitioned by the lamp housing 5 and the lamp lens. It is to be noted that, although not shown in the lamp room 50, there may be a case in which another lamp unit such as a fog lamp, a cornering lamp, a clearance lamp or a turn signal lamp is disposed. In addition, it is also to be noted that there may be a case in which the dimming control portion is disposed outside of the lamp room 50.

The lamp unit 2 for low beam and the lamp unit 3 for high beam are integrally mounted to the first mount member 51. The lamp unit 2 for low beam is disposed outside of a vehicle C (on a right side R in the case of a vehicle headlamp 1R on the right side, on a left side L in the case of a vehicle headlamp 1L on the left side). The lamp unit 3 for high beam is disposed inside of the vehicle C (on the left side L in the case of the vehicle headlamp 1R on the right side, on the left side L in the case of the vehicle headlamp 1L on the left side).

(Swivel Device 91)

The swivel device 91 is made of: a drive portion (not shown) and a driving force transmission mechanism (not shown) that are housed in a casing 92; and a rotary shaft 93. By driving the drive portion, a driving force of the drive portion is transmitted to the rotary shaft 93 via the driving force transmission mechanism. As a result, the rotary shaft 93 rotates around a vertical axis V-V (including a substantially vertical axis).

The first mount member 51 is fixed to the rotary shaft 93 of the swivel device 91. The vertical axis V-V of the rotary shaft 93 of the swivel device 91 passes through a center or a substantial center of the lamp unit 2 for low beam. As a result, the lamp unit 2 for low beam and the lamp unit 3 for high beam are configured in such a manner as to be integrated with each other and to be rotatable around the vertical axis V-V via the first mount member 51 by means of the swivel device 91.

The swivel device 91 is mounted to the second mount member 52. The second mount member 52 is mounted to the lamp housing 5 via the optical axis adjustment devices 53, 54, and 55.

The swivel device 91 is connected to a control device (not shown) via a camera sensor or a steering angle sensor (no shown), for example. When a detection signal of the steering angle sensor is input to the control device, the control device outputs a control signal to the swivel device 91. As a result, the swivel device 91 is driven to rotate the lamp unit 2 for low beam and the lamp unit 3 for high beam around the vertical axis V-V in accordance with left and right swiveling of the vehicle C.

(Optical Adjustment Devices 53, 54, and 55)

The optical axis adjustment devices 53, 54, and 55 are respectively made of: a pivot mechanism (53); top and bottom adjustment screws and screw mounting (54); and left and right adjustment screws and screw mounting (55). As a result, the lamp unit 2 for low beam and the lamp unit 3 for high beam are configured in such a manner as to be integrated with each other and to be optically adjustable, by means of the first mount member 51, the swivel device 91, and the second mount member 52.

(Lamp Unit 2 for Low Beam)

Figure 4:
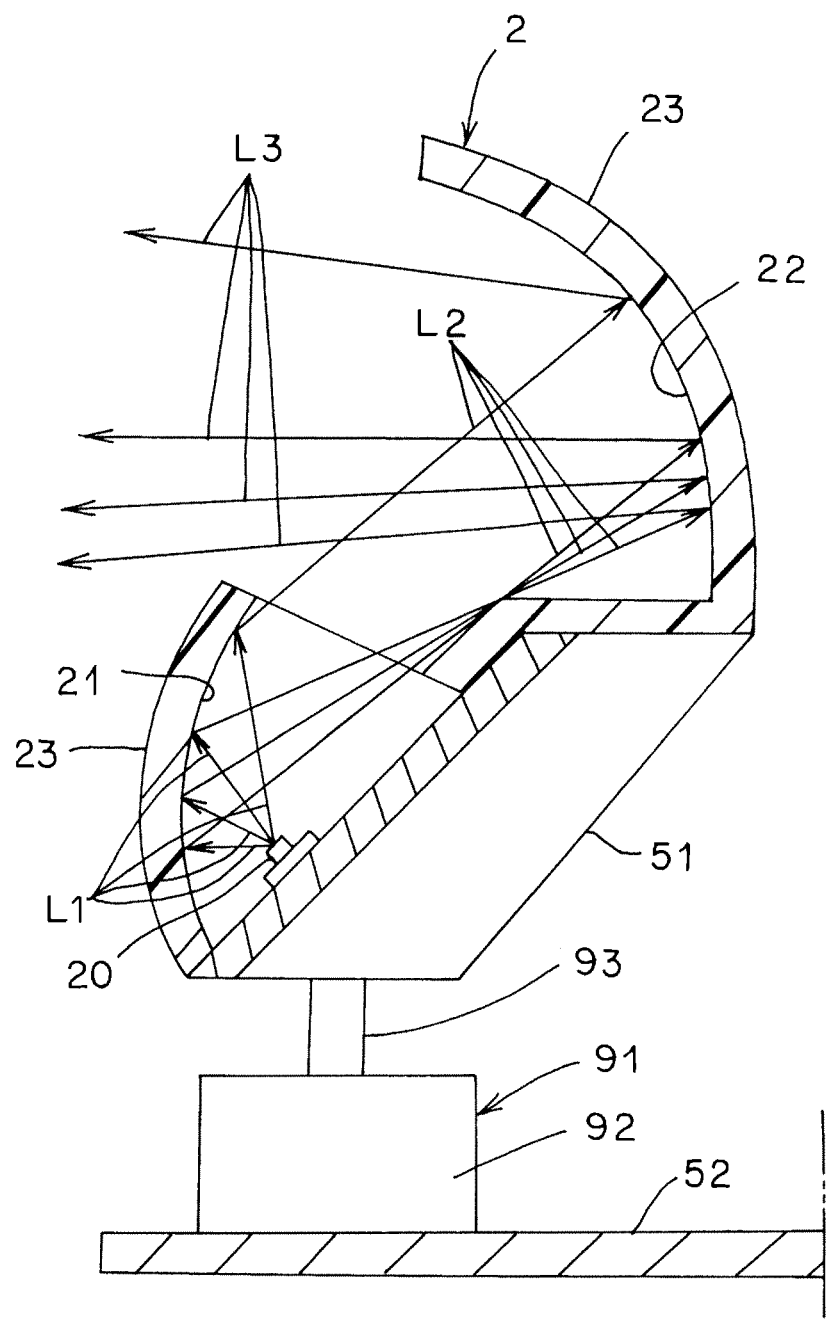
FIG. 4 is a sectional view taken along the line IV-IV in FIG. 2 (a longitudinal sectional view of a lamp unit for low beam)

The lamp unit 2 for low beam, as shown in FIG. 4, is made of a semiconductor-type light source 20, a reflector 23, and a heat sink member that is compatible with the first mount member 51.

The semiconductor-type light source 20 uses one's own light emitting semiconductor-type light source such as an LED, an EL (an organic EL) (an LED in the exemplary embodiment), for example. The semiconductor-type light source 20 is mounted to the first mount member 51 that is compatible with the heat sink member 51, together with the reflector 23.

The reflector 23 is made of: a first reflection surface 21 that is made of an elliptical reflection surface (a reflection surface made of a free curved surface based on (on the basis of or with reference to) an ellipse, or alternatively, a reflection surface made of a rotational elliptical surface); and a second reflection surface 22 that is made of a parabolic reflection surface (a reflection surface made of a free curved surface based on (on the basis of or with reference to) a parabolic line, or alternatively, a reflection surface made of a rotational parabolic surface).

The first reflection surface 21 is configured to reflect light L1 from the semiconductor-type light source 20 to the side of the second reflection surface 22. The second reflection surface 22 is configured to reflect the reflected light L2 from the first reflection surface 21. The reflected light L3 from the second reflection surface 22 is illuminated forward of the vehicle C, as light distribution patterns for low beam LLP and RLP shown in FIG. 7.

(Light Distribution Patterns for Low Beam LLP and RLP)

Figure 7:
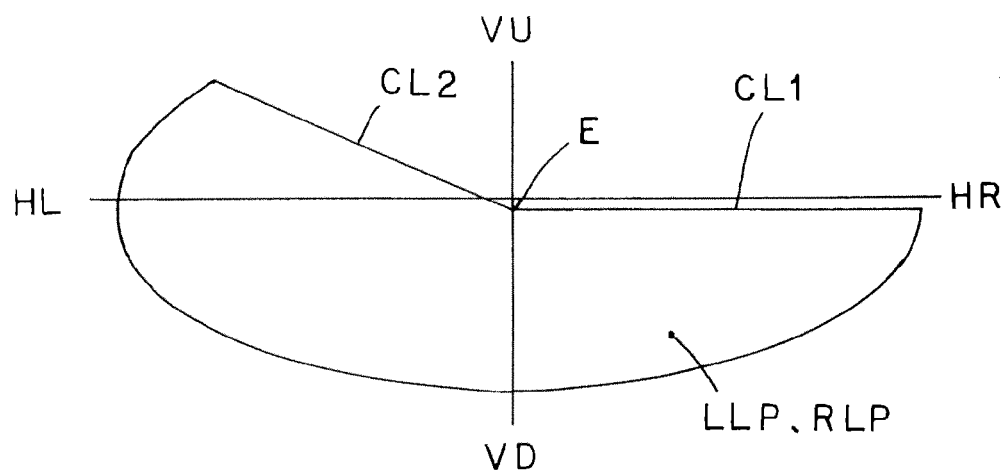
FIG. 7 is an explanatory view showing light distribution patterns for low beams on both of the left and right sides that are emitted forward of a vehicle from lamp units for low beams on both of the left and right sides.

The light distribution pattern for low beam (the light distribution pattern for low beam on the left side) LLP that is illuminated from the lamp unit 2 for low beam of the left side vehicle headlamp 1L to the front side of the vehicle C; and the light distribution pattern for low beam (the light distribution pattern for low beam on the right side) that is illuminated from the lamp unit 2 for low beam of the right side vehicle headlamp 1R to the front side of the vehicle C, as shown in FIG. 7, have: a horizontal cutoff line CL1 that is positioned on the upper right side; a cutoff line CL2 that is obliquely positioned (at an angle of 15 degrees) on the upper left side; and an elbow point E that is positioned at a crossing point between the horizontal cutoff line CL1 and the oblique cutoff line CL2. The horizontal cutoff line CL1 is positioned in such a manner as to be slightly lower than the horizontal line HL-HR on the left to right of the screen.

Figure 13:
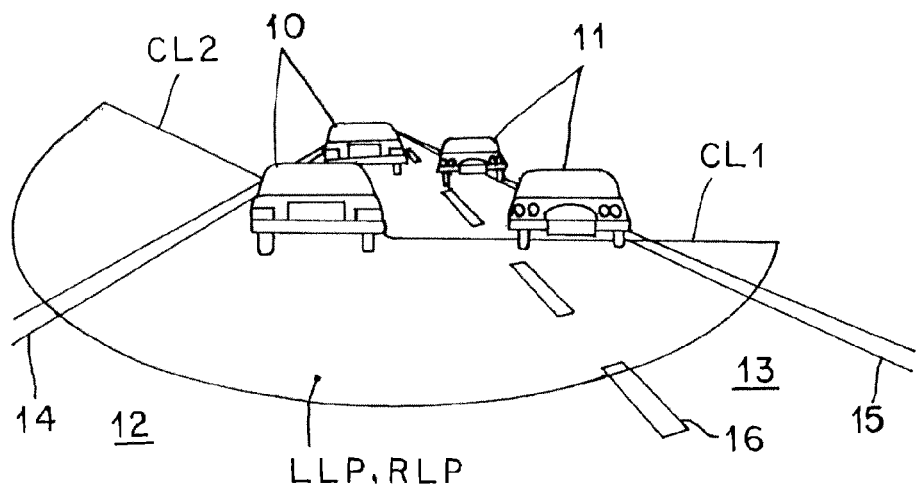
FIG. 13 is an explanatory view showing a road condition (a vehicle driving condition) that is established when the light distribution patterns for low beams on both of the left and right sides are emitted forward of the vehicle.

The light distribution patterns for low beam LLP and RLP, as shown in FIG. 13, are mainly configured to scatter and illuminate a front side of a left side driving lane 12 and a right side opposite lane 1 over a wide range. It is to be noted that a Z cutoff line may be employed in place of the oblique cutoff line CL2. It is also noted that reference numeral 16 in FIG. 13 designates a center line.

(Lamp Unit 3 for High Beam)

As is the case with the lamp unit 2 for low beam, the lamp unit 3 for high beam is made of: a semiconductor-type light source 30 and a reflector 33, a heat sink member that is compatible with the first mount member 51. The semiconductor-type light source 30 and the reflector 33 are mounted to the first mount member 51 that is compatible with the heat sink member.

The reflector 33 is made of: a first reflection surface (not shown) that is made of an elliptical reflection surface (a reflection surface made of a free curved surface based on (on the basis of or with reference to) an ellipse, or a reflection surface made of a rotational elliptical surface), second reflection surface rotational elliptical surface and a second reflection surface 32 that is made of a parabolic reflection surface.

The first reflection surface is configured to reflect light (not shown) from the semiconductor-type light source 30 to the side of the second reflection surface 32. The second reflection surface 32 is configured to reflect the reflected light (not shown) from the first reflection surface. The reflected light from the second reflection surface 32 is illuminated to the front side of the vehicle C, as light distribution patterns for high beam LHP and RHP shown in FIGS. 8, 9, and 11, and a light distribution patterns for shoulder edge beam LSP and RSP.

(Shade 8 and Shade Switching Device 80)

Figure 5:
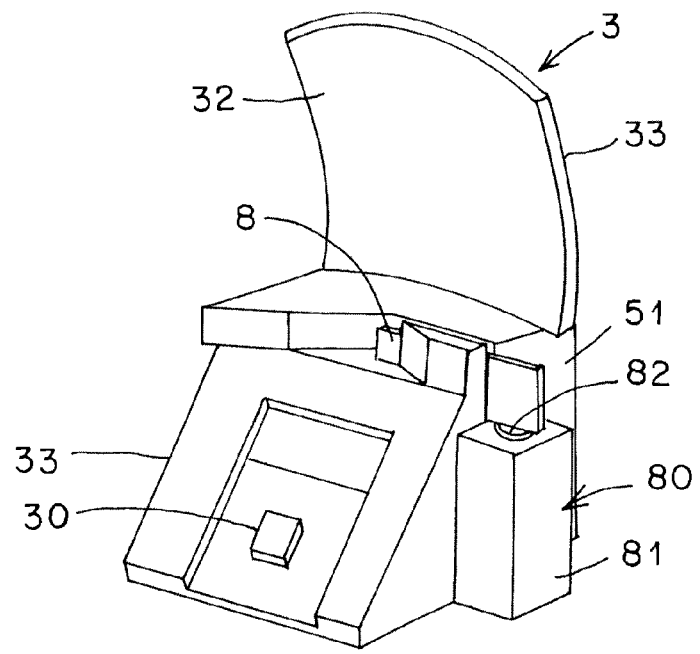
FIG. 5 is a perspective view showing a shade, a shade switching device, and a part of a lamp unit for high beam at the time of emission of a light distribution pattern for high beam.
Figure 6:
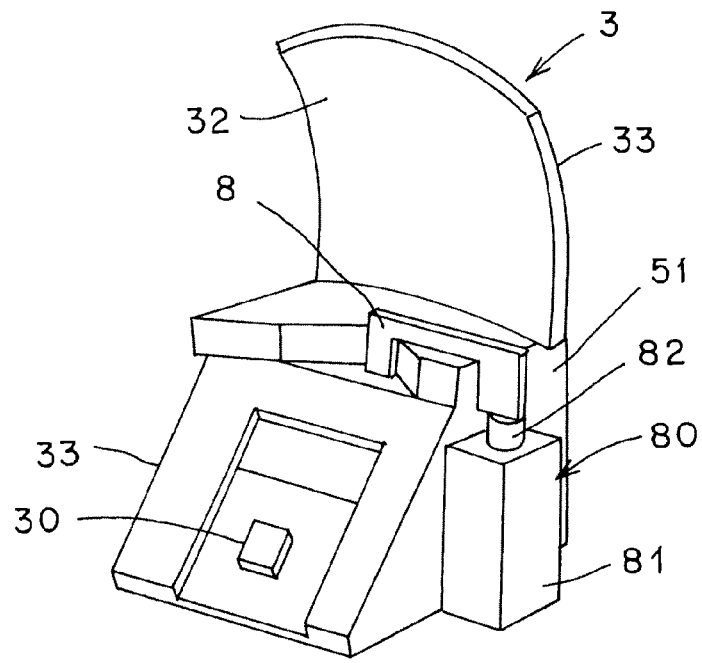
FIG. 6 is a perspective view showing a shade, a shade switching device, and a part of a lamp unit for high beam at the time of emission of a light distribution pattern for shoulder edge beam.

The shade switching device 80, as shown in FIG. 5 and FIG. 6, is configured to position the shade 8 in such a manner as to be movably switchable between a first location and a second location. The shade switching device 80 is made of a solenoid 81, a forward/backward rod 82, and a spring (not shown). The shade 8 is fixed to the forward/backward rod 82.

The shade switching device 80 is configured to position the shade 8 in such a manner as to be movably switchable between the first location shown in FIG. 5 and the second location shown in FIG. 6. In other words, in a state in which the solenoid 81 is powered on, as shown in FIG. 5, the forward/backward rod 82 is retracted against a spring force of the spring, and the shade 8 is positioned in the first location. In a state in which the solenoid 81 is powered off, as shown in FIG. 6, the forward/backward rod 82 is advanced by means of the spring force of the spring, and the shade 8 is positioned in the second location.

When the shade 8 is positioned in the first location, reflected light from the first reflection surface is incident to the second reflection surface 32 as it is, and the light distribution patterns for high beams LHP and RHP can be obtained as they are. When the shade 8 is positioned in the second location, a part of the reflected light from the first reflection surface (the reflected light inside of the vehicle C from among the reflected beams of light from the first reflection surface) is shaded by means of the shade 8, the remaining light is incident to the second reflection surface 32, and the light distribution patterns for shoulder edge beams LSP and RSP are formed. In other words, a part of the light distribution patterns for high beams LHP and RHP is shaded, and the light distribution patterns for shoulder edge beams LSP and RSP are formed.

(Light Distribution Patterns for High Beams LHP and RHP)

Figure 8:
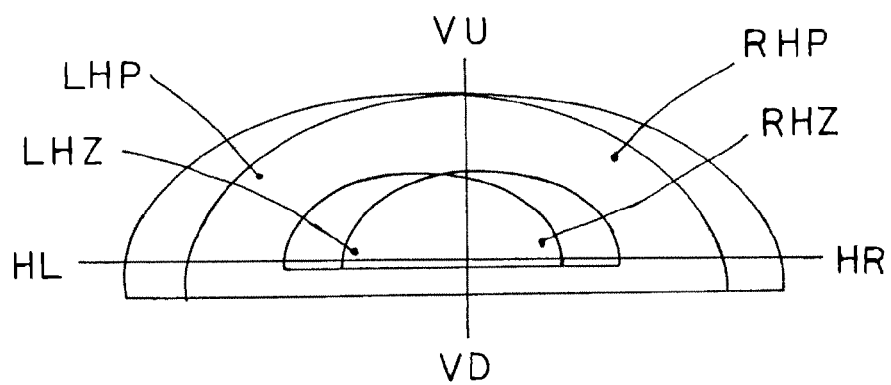
FIG. 8 is an explanatory view showing light distribution patterns for high beams on both of the left and right sides that are emitted forward of the vehicle from the lamp units for high beams on both of the left and right sides.
Figure 9:
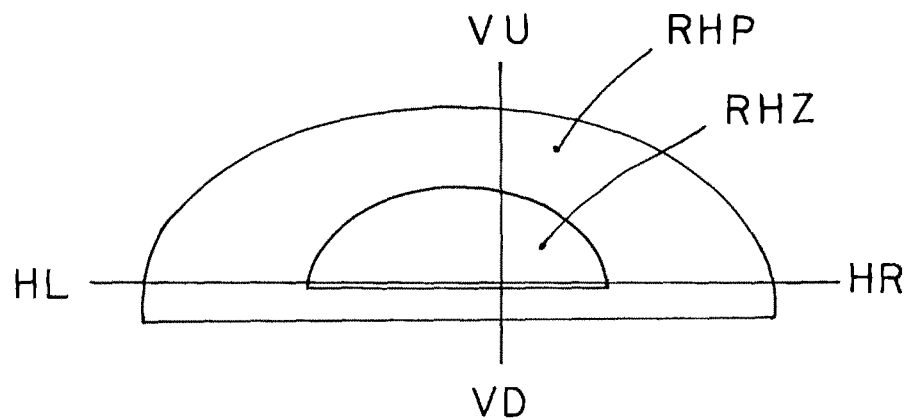
FIG. 9 is an explanatory view showing a light distribution pattern for high beam on the right side that is emitted forward of the vehicle from the lamp unit for high beam on the right side.
Figure 11:
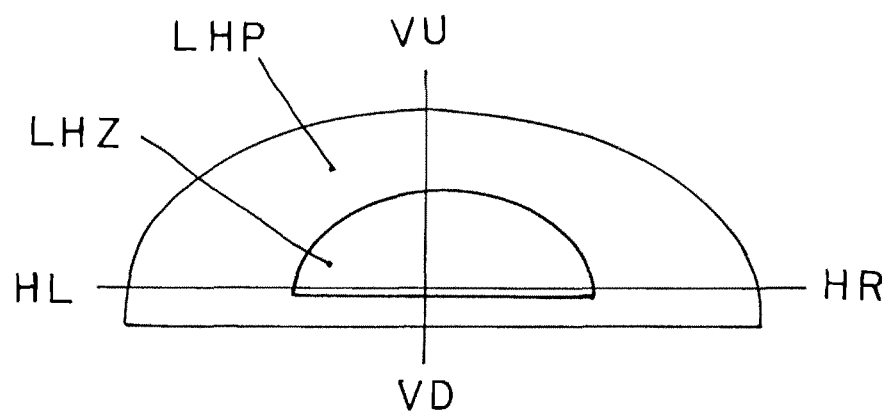
FIG. 11 is an explanatory view showing a light distribution pattern for high beam on the left side that is emitted forward of the vehicle from the lamp unit for high beam on the left side.

The light distribution pattern for high beam (the light distribution pattern for high beam on the left side) LHP that is emitted to the front side of the vehicle C from the lamp unit 3 for high beam of the vehicle headlamp 1L on the left side has a hot zone LHZ at a center portion, as shown in FIG. 8 and FIG. 11. The light distribution pattern for high beam (the light distribution pattern for high beam on the right side) RHP that is emitted to the front side of the vehicle C from the lamp unit 3 for high beam of the vehicle headlamp 1R on the right side has a hot zone RHZ at a center portion, as shown in FIG. 8 and FIG. 9.

The light distribution pattern for high beam LHP on the left side, as shown in FIG. 8 and FIG. 11 is positioned in such a manner as to be more rightward than the vertical line VU-VD from the top to bottom of the screen. The light distribution pattern for high beam RHP on the right side, as shown in FIG. 8 and FIG. 9, is positioned in such a manner as to be more leftward than the vertical line VU-VD from the top to bottom of the screen.

A lower side of a respective one of the hot zones LHZ and RHZ of the light distribution patterns for high beams LHP and RHP is positioned on or near below a horizontal line HL-HR from the left and right of the screen. A lower side of a respective one of the light distribution patterns LHP and RHP excluding the hot zones LHZ and RHZ is positioned in such a manner as to be lower than the horizontal line HL-HR from the left to right of the screen.

A lower side of a respective one of the hot zones LHZ and RHZ of the light distribution patterns for high beams LHP and RHP is equal to or more than 3 degrees in elevation in a longitudinal direction (in a vertical direction) and is equal to or more than at least 20 degrees in scattering width in a lateral direction (in a transverse direction). The hot zones LHZ and RHZ of the light distribution patterns for high beams LHP and RHP each are set to be equal to or less than 10 degrees in the lateral direction from the center to the left and right, its related light becomes weaker as the light travels in the lateral direction from the center to the left and right, the light having a luminous intensity of 40,000 cd to 210,000 cd.

Figure 14:
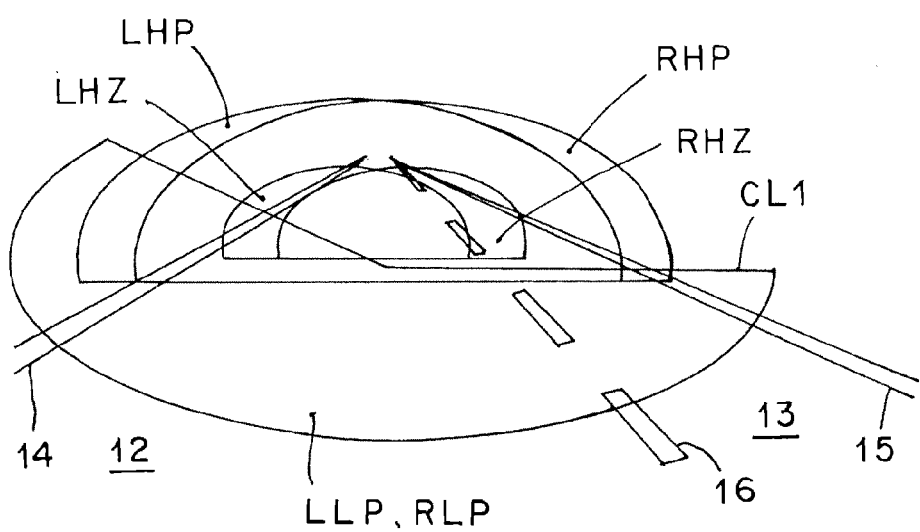
FIG. 14 is an explanatory view showing a road condition (a vehicle driving condition) that is established when the light distribution patterns for low beams on both of the left and right sides and the light distribution patterns for high beams on the left and right sides that are distributed to the inside of the vehicle are emitted forward of the vehicle.

The light distribution patterns for high beams LHP and RHP on both of the left and right sides each are provided in such a manner that when the swivel devices 91 on both of the left and right sides are established in an inactive state at an initial position, as shown in FIG. 8 and FIG. 14, a majority of the right side of the light distribution pattern for high beam LHP on the right side and a majority of the left side of the light distribution pattern for high beam RHP on the right side overlap each other, mainly optically focusing and illuminating a distal side of the driving lane 12 and the opposite lane 13.

(Light Distribution Patterns for Shoulder Edge Beams LSP and RSP)

Figure 10:
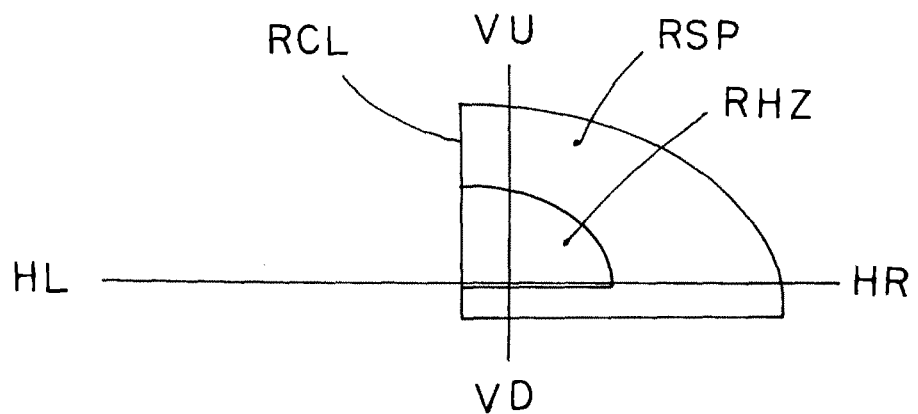
FIG. 10 is an explanatory view showing a light distribution pattern for shoulder edge beam on the right side that is emitted forward of the vehicle from the lamp unit for high beam on the right side.
Figure 12:
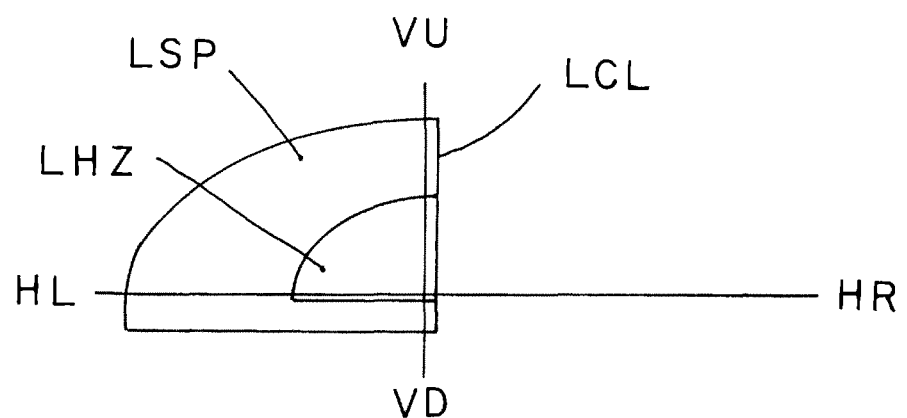
FIG. 12 is an explanatory view showing a light distribution pattern for shoulder edge beam on the left side that is emitted forward of the vehicle from the lamp unit for high beam on the left side.

The light distribution pattern for shoulder edge beam (the light distribution pattern for shoulder edge beam on the left side) LSP that is emitted to the front side of the vehicle C from the lamp unit 3 for high beam of the vehicle headlamp 1L on the left side is formed in such a manner that as shown in FIG. 12, a right half of the light distribution pattern for high beam LHP on the left side is shaded by means of the shade 8. A vertical cutoff line LCL and a hot zone LHZ are formed on the center side (on the right side) of the light distribution pattern for shoulder edge beam LSP on the left side. The light distribution pattern for shoulder edge beam (the light distribution pattern for shoulder edge beam on the right side) that is emitted to the front side of the vehicle C from the lamp unit 3 for high beam of the vehicle headlamp 1R on the right side is formed in such a manner that as shown in FIG. 10, a left half of the light distribution pattern RHP for high beam on the right side is shaded by means of the shade 8. A vertical cutoff line RCL and a hot zone RHZ are formed on the center side (on the left side) of the light distribution pattern for shoulder edge beam RSP on the right side.

The vertical cutoff line LCL of the light distribution pattern for shoulder edge beam LSP on the left side is positioned in such a manner as to be slightly rightward than the vertical line VU-VD from the top to bottom of the screen. The vertical cutoff line RCL of the light distribution pattern for shoulder edge beam RSP on the right side is positioned in such a manner as to be more leftward than the vertical line VU-VD from the top to bottom of the screen.

A lower side of the hot zones LHZ and RHZ of the light distribution patterns for shoulder edge beams LSP and RSP is positioned on or near below the horizontal line HL-HR from the left to right of the screen. A lower side of the light distribution patterns for shoulder edge beams LSP and RSP excluding the hot zones LHZ and RHZ is positioned in such a manner as to be lower than the horizontal line HL-HR from the left to right of the screen.

The light distribution patterns for shoulder edge beam LSP and RSP each are set at 3 degrees or more in height of a longitudinal direction (a vertical direction), and are set at least at 10 degrees in scattering width of a horizontal direction (a transverse direction). The hot zones LHZ and RHZ of the light distribution pattern for shoulder edge beam LSP and RSP are set within 5 degrees in a lateral direction from the vertical cutoff lines LCL and RCL. These hot zones become weaker in luminous intensity as it goes in the lateral direction from the vertical cutoff lines LCL and RCL, each of which has a luminous intensity of 40,000 to 210,000 cd.

Figure 15:
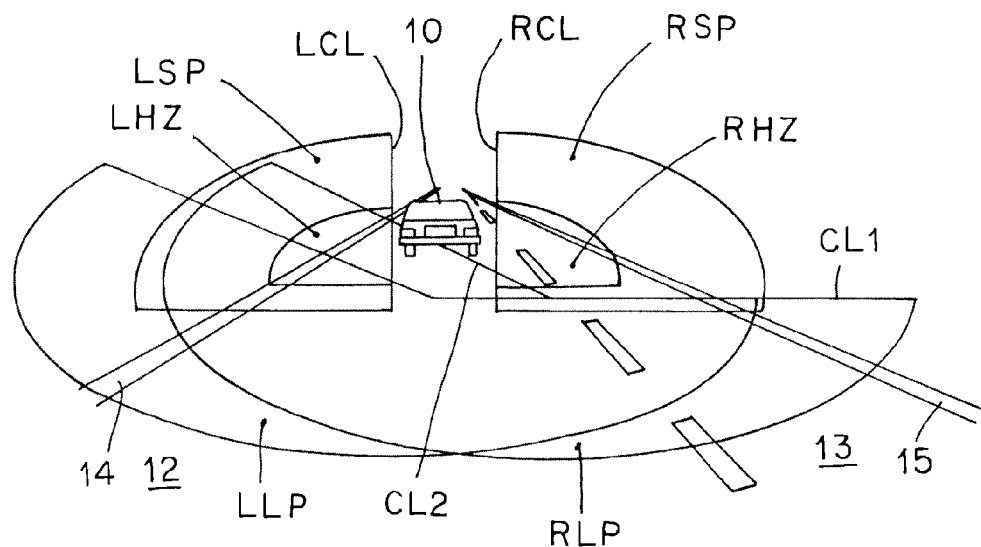
FIG. 15 is an explanatory view showing a road condition (a vehicle driving condition) that is established when the light distribution patterns for low beam on both of the left and right sides and the light distribution patterns for shoulder edge beam on the left and right sides that are distributed to the outside of the vehicle are emitted forward of the vehicle.
Figure 16:
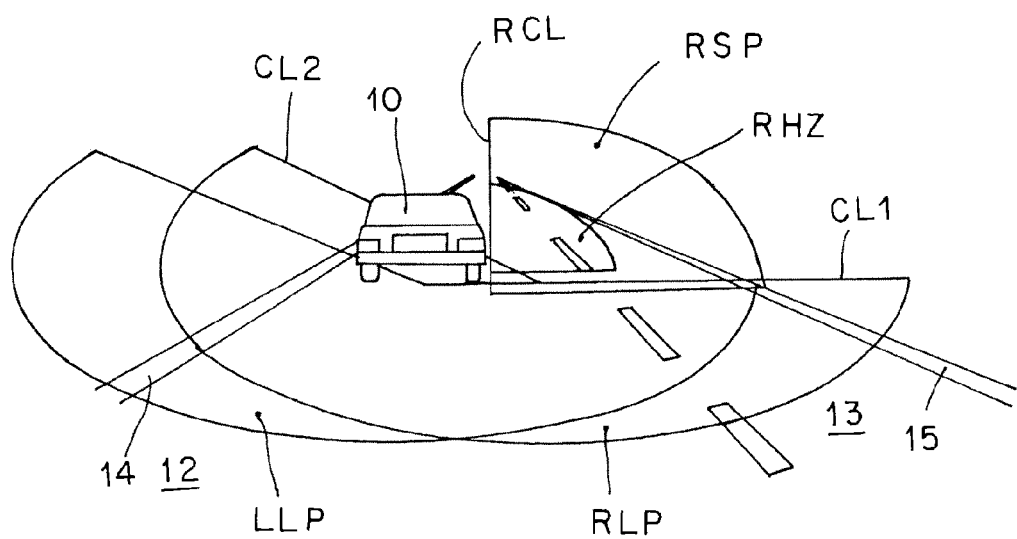
FIG. 16 is an explanatory view showing a road condition (a vehicle driving condition) that is established when the light distribution patterns for low beams on both of the left and right sides and the light distribution patterns for shoulder edge beam on the right side that are distributed to the inside of the vehicle are emitted forward of the vehicle.
Figure 17:
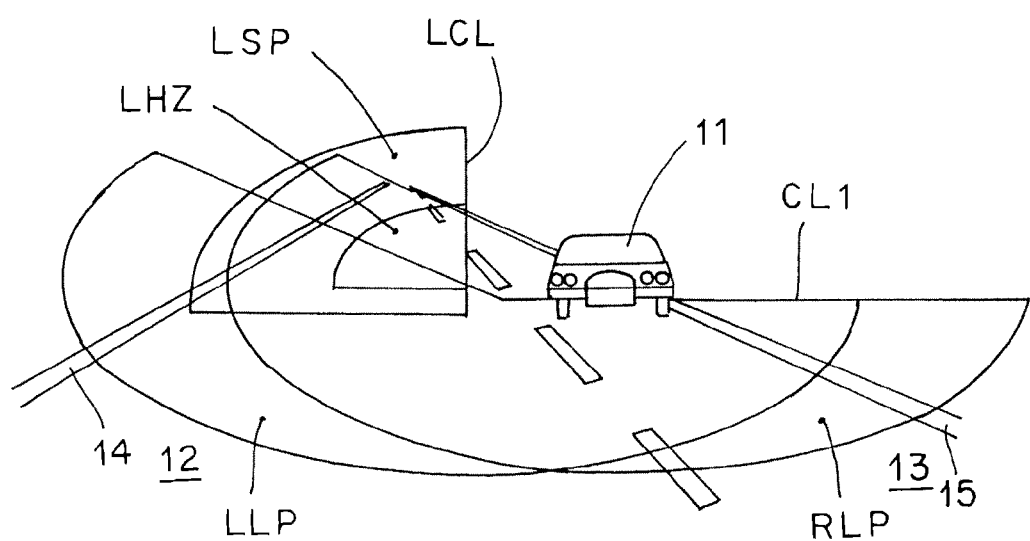
FIG. 17 is an explanatory view showing a road condition (a vehicle driving condition) that is established when the light distribution patterns on both of the left and right sides and the light distribution pattern for shoulder edge beam on the left side that are distributed to the inside of the vehicle are emitted forward of the vehicle.

When the swivel devices 91 on both of the left and right sides each are established in such a state as to be rotationally driven outside of the vehicle C, or alternatively, when the swivel devices 91 on both of the left and right sides each are established in such a state as to be rotationally driven from the outside of the vehicle C to the left side (to the side of the driving lane 12) or to the right side (to the side of the opposite lane 13), the light distribution patterns for shoulder edge beams LSP and RSP on both of the left and right sides are respectively independently distributed to the left and right, as shown in FIG. 15 to FIG. 17, mainly illuminating the shoulder edge 14 of the driving lane side and the shoulder edge 15 of the opposite lane side.

(Dimming Control Portion)

The dimming control portion is connected to the semiconductor-type light source 20 of the lamp unit 2 for low beam and the semiconductor-type light source 30 of the lamp unit 3 for high beam. The dimming control portion is configured to control dimming of the semiconductor-type light sources 20, 30 in order to gradually increase or gradually decrease luminous intensities of the light distribution patterns for low beam LLP and RLP, the light distribution patterns for high beam LHP and RHP, and the light distribution patterns for shoulder edge beam LSP and RSP. Dimming control of the semiconductor-type light sources 20, 30 are based on binary notation pulse width modulation, for example, and is carried out by decreasing and increasing a duty ratio of an ON pulse width or a duty ratio of an OFF pulse width.

(Vehicle Headlamp System)

A vehicle headlamp system is provided with: the vehicle headlamps 1L and 1R; a detecting portion 9 configured to detect whether or not a preceding vehicle 10 or an opposite vehicle 11 exists; and a control portion 90 configured to output a control signal to the vehicle headlamps 1L and 1R and the shade switching device 80, based on a detection signal from the detecting portion 9. The control portion 90 may be compatible with the control device of the swivel device 91.

The detecting portion 9 outputs a first detection signal to the control portion 90 if one or a plurality of preceding vehicles 10 and opposite vehicles 11 exist forward of a driving vehicle, as shown in FIG. 13; outputs a second detection signal to the control portion 90 if neither a preceding vehicle 10 nor an opposite vehicle 11 exists forward of the driving vehicle, as shown in FIG. 14; outputs a third detection signal to the control portion 90 if one or a plurality of forward vehicles 10 is/are distant from the driving vehicle and no opposite vehicle 11 exists forward of a driving vehicle, as shown in FIG. 15; and outputs a fourth detection signal to the control portion 90 if one or a plurality of preceding vehicles 10 approach and no opposite vehicle 11 exists forward of the driving vehicle, as shown in FIG. 16; and outputs a fifth detection signal to the control portion 90 if no preceding vehicle 10 exists or a plurality of opposite vehicles 11 approach and exist forward of a driving vehicle, as shown in FIG. 17. The detecting portion 9 uses a CCD camera, for example.

The control portion 90 is provided with the dimming control portion. The control portion 90 uses an ECU or the like, for example. The control portion 90 outputs a first control signal to the semiconductor-type light sources 20, 30, the shade switching device 80 and the swivel device 91 of the vehicle headlamps 1L and 1R by means of the first detection signal from the detecting portion 9; outputs a second control signal to the semiconductor-type light sources 20, 30, the shade switching device 80 and the swivel device 91 of the vehicle headlamps 1L and 1R by means of the second detection signal from the detecting portion 9; outputs a third control signal to the semiconductor-type light sources 20, 30, the shade switching device 80 and the swivel device 91 of the vehicle headlamps 1L and 1R by means of the third detection signal from the detecting portion 9; outputs a fourth control signal to the semiconductor-type light sources 20, 30, the shade switching device 80 and the swivel device 91 of the vehicle headlamps 1L and 1R by means of the fourth detection signal from the detecting portion 9; and outputs a fifth control signal to the semiconductor-type light sources 20, 30, the shade switching device 80 and the swivel device 91 of the vehicle headlamps 1L and 1R by means of the fifth detection signal from the detecting portion 9.

The vehicle headlamps 1L and 1R are provided in such a manner that control of turning on or off of the semiconductor-type light sources 20, 30 and control of activation or deactivation of the shade switching device 80, and activation or deactivation of the swivel device 91 are carried out by means of the control signal from the control portion 90 based on the detection signal from the detecting portion 9.

In other words, by means of the first control signal from the control portion 90, the semiconductor-type light source 20 of the lamp unit 2 for low beam is controlled in an illuminative state, the semiconductor-type light source 30 of the lamp unit 3 for high beam is controlled in a non-illuminative state, and the swivel device 91 is controlled in an inactive state at initial state. Since the semiconductor-type light source 30 of the lamp unit 3 for high beam is controlled in non-illuminative, the shade switching device 80 is controlled in any one of the first position state or the second position state.

By means of the second control signal from the control portion 90, the semiconductor-type light source 20 of the lamp unit 2 for low beam, the semiconductor-type light source 30 of the lamp unit 3 for high beam are controlled in an illuminative state, the shade switching device 80 is controlled in the first position state, and the swivel device 91 is controlled in an inactive state at initial state.

By means of the third control signal from the control portion 90, the semiconductor-type light source 20 of the lamp unit 2 for low beam and the semiconductor-type light source 30 of the lamp unit 3 for high beam are controlled in an illuminative state, the shade switching device 80 is controlled in the second position state, and the swivel device 91 is controlled in a rotate driving state to the outside of the vehicle C from in an inactive state at initial state.

By means of the fourth control signal from the control portion 90, the semiconductor-type light source 20 of the lamp unit 2 for low beam and the semiconductor-type light source 30 of the lamp unit 3 for high beam on the right side are controlled in an illuminative state; the semiconductor-type light source 30 of the lamp unit 3 for high beam on the left side is controlled in a non-illuminative state, the shade switching device 80 on the right side is controlled in the second position state, and the swivel device 91 is controlled in a state in which the swivel device is driven to swivel to the left direction from the rotate driving state of outside of vehicle C. In this case, at a time point when the swivel device 91 has reached its own left side swivel range, the semiconductor-type light source 30 of the lamp unit 3 for high beam on the left side is controlled in a non-illuminative state. Since the semiconductor-type light source 30 of the lamp unit 3 for high beam on the left side is controlled in a non-illuminative state, so the shade switching device 80 on the left side is controlled in any one of the first position state and the second position state.

By means of the fifth control signal from the control portion 90, the semiconductor-type light source 20 of the lamp unit 2 for low beam and the semiconductor-type light source 30 of the lamp unit 3 for high beam on the left side are controlled in an illuminative state, the semiconductor-type light source 30 of the lamp unit 3 for high beam on the right side is controlled in a non-illuminative state, the shade switching device 80 on the left side is controlled in the second position state, and the swivel device 91 is controlled in a state in which driven to rotate to the right side from the rotate driving state of the outside of the vehicle C. In this case, at a time point when the swivel device 91 has reached a right side rotation range, the semiconductor-type light source 30 of the lamp unit 3 for high beam on the right side is controlled in a non-illuminative state. Since the semiconductor-type light source 30 of the lamp unit 3 for high beam on the right side is controlled in a non-illuminative state, so the shade switching device 80 on the right side is controlled in any one of the first position state and the second position state.

(Functions of First Embodiment)

The vehicle headlamp system according to the first embodiment (the vehicle headlamps 1L and 1R and the vehicle headlamp device) is made of the constituent elements as described above, and hereinafter, its related functions will be described.

First, as shown in FIG. 13 to FIG. 17, the light distribution patterns for low beam LLP and RLP on both of the left and right sides are illuminated forward of the vehicle C (one's own vehicle in the Functions of First embodiment section) from the lamp units 2 for low beam of the vehicle headlamps 1L and 1R on both of the left and right sides.

Here, as shown in FIG. 13, if one or a plurality of preceding vehicles 10 and opposite vehicles 11 exist forward of the vehicle C, the detecting portion 9 outputs the first detection signal to the control portion 90 and then the control portion 90 outputs the first control signal to the vehicle headlamps 1L and 1R, the shade switching device 80, and the swivel device 91. Afterwards, the semiconductor-type light source 20 of the lamp unit 2 for low beam is controlled in an illuminative state, the semiconductor-type light source 30 of the lamp unit 3 for high beam is controlled in a non-illuminative state, the shade switching device 80 is controlled in any one of the first position state and the second position state, and the swivel device 91 is controlled in an inactive state at initial state.

Therefore, as shown in FIG. 13, only the light distribution patterns for low beam LLP and RLP on both of the left and right sides are illuminated forward of the vehicle C from the lamp units 2 for low beam of the vehicle headlamps 1L and 1R on both of the left and right sides. As a result, by means of the light distribution patterns for low beam LLP and RLP on both of the left and right sides, the front sides of the driving lane 12 and the opposite lane 13 can be illuminated over a wide range. On the other hand, by means of the horizontal cutoff lines CL1 and the oblique cutoff line CL2 of the light distribution patterns for low beam LLP and RLP on both of the left and right sides, there can hardly occur a case in which nuisance light to one or a plurality of preceding vehicles 10 and opposite vehicles 11 forward of the vehicle C, making it possible to contribute to safe driving.

Herein, as shown in FIG. 14, if no preceding vehicle 10 and opposite vehicle 11 exist forward of the vehicle C, the detecting portion 9 outputs the second detection signal to the control portion 90 and then the control portion 90 outputs the second control signal to the vehicle headlamps 1L and 1R, the shade switching device 80, and the swivel device 91. Afterwards, the semiconductor-type light source 20 of the lamp unit 2 for low beam and the semiconductor-type light source 30 of the lamp unit 3 for high beam are controlled in an illuminative state, the shade switching device 80 is controlled in the first position state, and the swivel device 91 is controlled in an inactive state at initial state.

Therefore, as shown in FIG. 14, those which are illuminated forward of the vehicle C are the light distribution patterns for low beam LLP and RLP on both of the left and right sides from the lamp units 2 for low beam of the vehicle headlamps 1L and 1R on both of the left and right sides; the light distribution patterns for high beam LHP and RHP on both of the left and right sides from the lamp units 3 for high beam of the vehicle headlamps 1L and 1R on both of the left and right side. As a result, by means of the light distribution patterns for low beam LLP and RLP on both of the left and right sides, the light distribution patterns for high beam LHP and RHP in state which most part of the left and most part of right sides are superimposed on each other, the front sides and distal sides of the driving lane 12 and the opposite lane 13 and further the shoulder edge 14 of the driving lane side and the shoulder edge 15 of the opposite lane side can be illuminated over a wide range, making it possible to contribute to safe driving.

Here, a lower side of the horizontal cutoff line CL1 of the light distribution patterns for low beam LLP and RLP on both of the left and right sides and a lower side of the light distribution pattern for high beam LHP and RHP on the left and right sides excluding the hot zone RHZ overlap on each other. Therefore, in an overlap portion between the light distribution patterns for low beam LLP and RLP and the light distribution pattern for high beam LHP and RHP on the left and right sides, there can hardly occur a case in which a line of intense light or a line of missing of light is generated. As a result, a visual recognition property in this overlap portion is improved, making it possible to contribute to safe driving.

Subsequently, as shown in FIG. 15, if one or a plurality of preceding vehicles 10 is/are distant and no opposite vehicle 11 exists forward of the vehicle C, the detecting portion 9 outputs the third detection signal to the control portion 90 and then the control portion 90 outputs the third control signal to the vehicle headlamps 1L and 1R, the shade switching device 80, and the swivel device 91. Afterwards, the semiconductor-type light source 20 of the lamp unit 2 for low beam and the semiconductor-type light source 30 of the lamp unit 3 for high beam are controlled in an illuminative state, the shade switching device 80 is controlled in the second position state, and the swivel device 91 is controlled in an inactive state at initial state from in the rotate driving state to outside of the vehicle C.

Therefore, as shown in FIG. 15, those which are directed in horizontal direction from inside to outside of the vehicle C and then illuminated forward of the vehicle C are the light distribution patterns for low beam LLP and RLP on both of the left and right sides from the lamp units 2 for low beam of the vehicle headlamps 1L and 1R on both of the left and right sides; and the light distribution patterns for shoulder edge beam LSP and RSP on both of the left and right sides from the lamp units 3 for high beam of the vehicle headlamps 1L and 1R on both of the left and right sides. As a result, by means of the light distribution patterns for low beam LLP and RLP on both of the left and right sides directed to outside of the vehicle C, the front sides of the driving lane 12 and the opposite lane 13 can be illuminated over a wide range, and by means of the light distribution patterns for shoulder edge beam LSP and RSP on both of the left and right sides directed to outside of the vehicle C, the shoulder edge 14 of the driving lane side and the shoulder edge 15 of the opposite lane side can be illuminated. On the other hand, by means of the oblique cutoff line CL2 of the light distribution patterns for low beam LLP and RLP on both of the left and right sides and the vertical cutoff lines LCL and RCL of the light distribution patterns for shoulder edge beam LSP and RSP on both of the left and right sides, there can hardly occur a case in which nuisance light is imparted to one or a plurality of preceding vehicles 10 forward of the vehicle C, making it possible to contribute to safe driving.

Here, in an overlap portion between a lower side of the horizontal cutoff line CL1 of the light distribution patterns for low beam LLP and RLP on both of the left and right sides and a lower side of the light distribution pattern for shoulder edge beam RSP on the right side excluding the hot zone RHZ, there can hardly occur a case in which a line of intense light or a line of missing of light is generated. As a result, the visual recognition property in this overlap portion is improved, making it possible to contribute to safe driving.

In addition, as shown in FIG. 16, if one or a plurality of preceding vehicles 10 approach and no opposite vehicle 11 exists forward of the vehicle C, the detecting portion 9 outputs the fourth signal to the control portion 90 and then the control portion 90 outputs the fourth control signal to the vehicle headlamps 1L and 1R, the shade switching device 80 and the swivel device 91. Afterwards, the semiconductor-type light source 20 of the lamp unit 2 for low beam and the semiconductor-type light source 30 of the lamp unit 3 for high beam on the right side are controlled in an illuminative state, the semiconductor-type light source 30 of the lamp unit 3 for high beam on the left side is controlled in a non-illuminative state, the shade switching device 80 on the right side is controlled in the second position state, and the shade switching device 80 on the left side is controlled in any one of the first position state and the second position state, and the swivel device 91 is controlled in a state in which the swivel device is driven to swivel to the left side (to the side of the driving lane 12). Here, at a time point when the swivel device 91 has reached its own left side swivel range, the semiconductor-type light source 30 of the lamp unit 3 for high beam on the left side is controlled in a non-illuminative state.

Therefore, as shown in FIG. 16, those which are illuminated forward of the vehicle C are the light distribution patterns for low beam LLP and RLP on both of the left and right sides from the lamp units 2 for low beam of the vehicle headlamps 1L and 1R on both of the left and right sides; the light distribution pattern for shoulder edge beam RSP on both of the left and right side from the lamp units 3 for high beam of the vehicle headlamp 1R on right side; and the light distribution patterns for low beam LLP and RLP on both of the left and right sides and the light distribution pattern for shoulder edge beam RSP on the right side are distributed to the left side. As a result, by means of the light distribution patterns for low beam LLP and RLP on both of the left and right sides, the light distributed patterns being distributed to the left side, the front sides of the driving lane 12 and the opposite lane 13 and the shoulder edge 14 of the driving lane side can be illuminated over a wide range, and by means of the light distribution pattern for shoulder edge beam RSP on the right side that is distributed to the left side, the right side of the driving lane 12 and the distal side of the opposite lane 13 can be illuminated. On the other hand, by the oblique cutoff line CL2 of the light distribution patterns for low beam LLP and RLP on both of the left and right sides, the light distribution patterns being distributed to the left side, and the vertical cutoff line RCL of the light distribution pattern for shoulder edge beam RSP on the right side that is distributed to the left side, there can hardly occur a case in which nuisance light is imparted to one or a plurality of preceding vehicles 10 approaching forward of the vehicle C, making it possible to contribute to safe driving.

Here, in an overlap portion between a lower side of the horizontal cutoff line CL1 of the light distribution patterns for low beam LLP and RLP on both of the left and right sides and a lower side of the light distribution pattern for shoulder edge beam RSP on the right side excluding the hot zone RHZ, there can hardly occur a case in which a line of intense light or a line of missing of light is generated. As a result, the visual recognition property in this overlap portion is improved, making it possible to contribute to safe driving.

In addition, as shown in FIG. 17, if no forward preceding vehicle 10 exists and one or a plurality of opposite vehicles 11 approaches forward of the vehicle C, the detecting portion 9 outputs the fifth detection signal to the control portion 90 and then the control portion 90 outputs the fifth control signal to the vehicle headlamps 1L and 1R, the shade switching device 80 and the swivel device 91. Afterwards, the semiconductor-type light source 20 of the lamp unit 2 for low beam and the semiconductor-type light source 30 of the lamp unit 3 for high beam on the left side are controlled in an illuminative state, and the semiconductor-type light source 30 of the lamp unit 3 for high beam on the right side is controlled in a non-illuminative state, the shade switching device 80 on the left side is controlled in the second position state, and the shade switching device 80 on the right side is controlled in any one of the first position and the second position, and the swivel device 91 is controlled in a state in which the swivel device is driven to swivel to the right side (to the side of the opposite lane 13). Here, at a time when the swivel device 91 has reached its own right side swivel range, the semiconductor-type light source 30 of the lamp unit 3 for high beam on the right side is controlled in a non-illuminative state.

Therefore, as shown in FIG. 17, those which are illuminated forward of the vehicle C are the light distribution patterns for low beam LLP and RLP on both of the left and right sides from the lamp units 2 for low beam of the vehicle headlamps 1L and 1R on both of the left and right sides; and the light distribution pattern for shoulder edge beam LSP on the left side from the lamp unit 3 for high beam of the vehicle headlamp 1L on the left side, and those which are distributed to the right side are the light distribution patterns for low beam LLP and RLP on both of the left and right sides; and the light distribution pattern for shoulder edge beam LSP on the left side. As a result, by means of the light distribution patterns for low beam LLP and RLP on both of the left and right sides, the light distribution patterns being distributed to the right side, the front sides of the driving lane 12 and the opposite lane 13 and the shoulder edge 15 on the opposite lane side can be illuminated over a wide range, and by means of the light distribution pattern for shoulder edge beam LSP on the left side that is distributed to the right side, the distal sides of the driving lane 12 and the opposite lane 13 and the shoulder edge 14 of the driving lane side can be illuminated. On the other hand, by means of the horizontal cutoff line CL1 of the light distribution patterns LLP and RLP on both of the left and right sides, the light distribution patterns being distributed to the right side, and the vertical cutoff line LCL of the light distribution pattern for shoulder edge LSP on the left side, the light distribution pattern being distributed to the right side, there can hardly occur a case in which nuisance light is imparted to one or a plurality of opposite vehicles 11 approaching forward of the vehicle C, making it possible to contribute to safe driving.

Each of FIG. 13 to FIG. 17 is an explanatory view of a case of a straight route. In the case of a curved route, the light distribution patterns for low beam LLP and RLP on both of the left and right sides; the light distribution patterns for high beam LHP and RHP on both of the left and right sides; and the light distribution patterns for shoulder edge beam LSP and RSP on both of the left and right sides are distributed in a horizontal direction (in a transverse direction) in accordance with left and right steering swiveling of the vehicle C.

(Advantageous Effects of First Embodiment)

The vehicle headlamp system according to the first embodiment (the vehicle headlamps 1L and 1R and the vehicle headlamp device) are made of the constituent elements and functions as described above, and hereinafter, its related advantageous effects will be described.

The vehicle headlamp system according to the first embodiment uses lamp units of a reflector reflection and light distribution type as the lamp units 2 for low beam on both of the left and right sides, the lamp units 3 for high beam on both of the left and right sides. Thus, light L1 from the semiconductor-type light source 20 can be effectively utilized in comparison with a lamp unit of a projector type. In addition, a light distribution design configured to form the light L1 from the semiconductor-type light source 20 in predetermined light distribution patterns (the light distribution patterns for low beam LLP and RLP on both of the left and right sides, the light distribution patterns for high beam LHP and RHP that are compatible with the light distribution patterns for shoulder edge beam LSP and RSP on both of the left and right sides) by means of the first reflection surface 21 and the second reflection surface 22 of the reflector 23 is simplified in comparison with a lamp unit of a lens direct emission and light distribution type.

Moreover, the vehicle headlamp system according to the first embodiment is provided in such a manner that multifunctional light distribution patterns (multifunctional light distribution patterns that are obtained by using a combination of the light distribution patterns for low beam LLP and RLP on both of the left and right sides, the light distribution patterns for high beam LHP and RHP on both of the left and right sides, or the light distribution patterns for shoulder edge beam LSP and RSP on both of the left and right sides) can be obtained by turning on or off the semiconductor-type light sources 20 of the lamp units 2 for low beam on both of the left and right sides, turning on or off the semiconductor-type light source 30 of the lamp units 3 for high beam on both of the left and right sides, driving stop of the shade switching device 80, driving stop of the swivel device 91.

The vehicle headlamp system according to the first embodiment is provided in such a manner that light distribution patterns for low beam LLP and RLP on both of the left and right sides, light distribution patterns for high beam LHP and RHP on both of the left and right sides, or light distribution patterns for shoulder edge beam LSP and RSP on both of the left and right sides can be distributed in a horizontal direction (in a transverse direction) by means of the swivel device 91; and therefore, further multifunctional light distribution patterns can be obtained. In addition, the light distribution patterns for low beam LLP and RLP on both of the left and right sides can be distributed in a horizontal direction; and therefore, the visual recognition property in a swivel direction at the time of driving on a curved route (a curve) can be enhanced, making it possible to contribute to safe driving.

The vehicle headlamp system according to the first embodiment is provided in such a manner that the vertical axis V-V of the rotary shaft 93 of the swivel device 91 passes through a center or a substantial center of the lamp unit 2 for low beam; and therefore, when the light distribution patterns for low beam LLP and RLP on both of the left and right sides are distributed in a horizontal direction by means of the swivel device 91, deformation of the light distribution patterns for low beam LLP and RLP on both of the left and right sides can be reduced to their required minimum levels.

Second Embodiment

Figure 18:
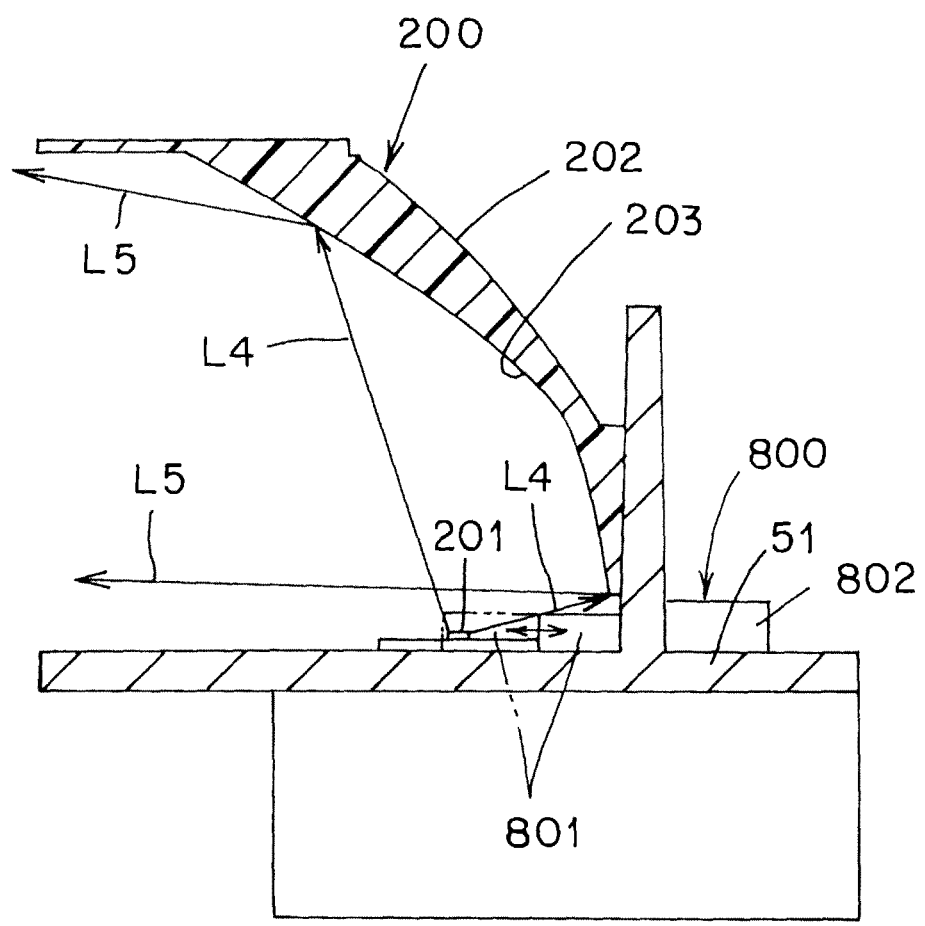
FIG. 18 is a vertical sectional of a lamp unit for low beam view (a longitudinal sectional view or a sectional view that corresponds to FIG. 4) showing a second embodiment of a vehicle headlamp system according to the present invention.
Figure 19:
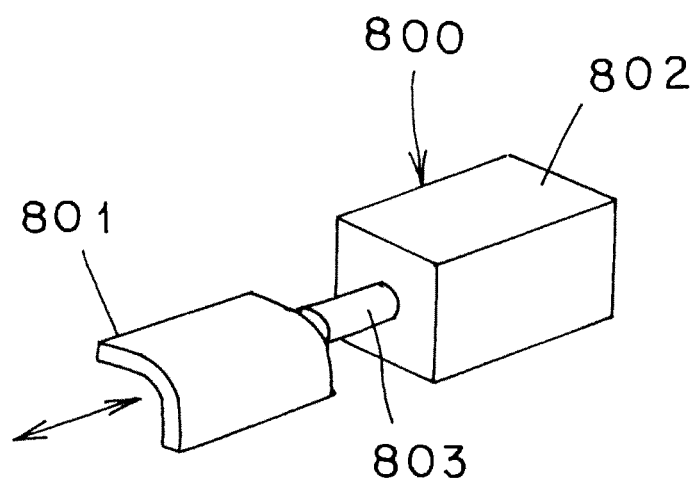
FIG. 19 is a perspective view showing a shade and a shade switching device.

FIG. 18 and FIG. 19 are shows a second embodiment of a vehicle headlamp according to the present invention. Hereinafter, the vehicle headlamp in the second embodiment will be described. In the figure, like constituent elements are designated by like reference numerals in FIG. 1 to FIG. 17.

The vehicle headlamps 1L and 1R according to the first embodiment, as shown in FIG. 4 to FIG. 6, use lamp units (the lamp units 2 for low beams on both of the left and right sides and the lamp units 3 for high beams on both of the left and right sides), a respective one of which is made of: semiconductor-type light sources 20 and 30; and reflectors 23 and 33, a respective one of which has a first reflection surface 21 and second reflection surfaces 22 and 23. On the other hand, the vehicle headlamps according to the second embodiment, as shown in FIG. 18, use lamp units (the lamp units for low beams on both of the left and right sides and the lamp units 200 for high beams on both of the left and right sides), a respective one of which is made of a semiconductor-type light source 201 and a reflector 202 that has a reflection surface 203. The reflection surface 203 is configured to reflect light L4 from the semiconductor-type light source 201 and then by means of the reflected light L5, form predetermined light distribution patterns (the light distribution patterns for low beams LLP and RLP on both of the left and right sides, the light distribution patterns for high beams LHP and RHP on both of the left and right sides and the light distribution patterns for shoulder edge beams LSP and RSP on both of the left and right sides).

As is the case with the vehicle headlamps 1L and 1R according to the first embodiment, the vehicle headlamps according to the second embodiment each are provided with a shade 801 and a shade switching device 800, as shown in FIG. 18 and FIG. 19.

The shade switching device 800, as shown in FIG. 18 and FIG. 19, is configured to position the shade 801 in such a manner as to be movably switchable between a first location (the location indicated by the solid line in FIG. 18) and a second location (the location indicated by the double dotted chain line in FIG. 18). The shade switching device 800 is made of a solenoid 802, a forward/backward rod 803, and a spring (not shown). The shade 801 is fixed to the forward/backward rod 803.

The shade switching device 800 is configured to position the shade 801 in such a manner as to be movably switchable between the first location and the second location. In other words, in a state in which the solenoid 802 is powered on, the forward/backward rod 803 is retracted against a spring force of the spring, and the shade 801 is positioned in the first location. In a state in which the solenoid 802 is turned off, the forward/backward rod 803 is advanced by means of the spring force of the spring, and the shade 801 is positioned in the second location.

When the shade 801 is positioned in the first location, light L4 from the semiconductor-type light source 201 is incident to the reflection surface 203 as it is, and the light distribution patterns for high beams LHP and RHP can be obtained as they are. When the shade 801 is positioned in the second location, a part of the reflected light L4 from the semiconductor-type light source 201 (the light L4 inside of the vehicle C from beam of the light L4 from the semiconductor-type light source 201) is shaded by means of the shade 801, the remaining light is incident to the reflection surface 203, and the light distribution patterns for shoulder edge beams LSP and RSP are formed. In other words, a part of the light distribution patterns LHP and RHP for high beams (a portion inside of the vehicle C) is shaded, and the light distribution patterns for shoulder edge beams LSP and RSP are formed.

The vehicle headlamps in the second embodiment are capable of achieving functions and advantageous effects that are substantially identical to those of the vehicle headlamps 1L and 1R in the first embodiment described previously. In particular, the vehicle headlamps of the second embodiment respectively are small in size in comparison with the vehicle headlamps 1L and 1R in the first embodiment described previously; and therefore, the vehicle headlamps are suitable in a case where they are installed in a small space.

(Examples Other than First and Second Embodiments)

The first and second embodiments have described the vehicle headlamps 1L and 1R in a case where the vehicle C is configured to travel on the left side. However, the present invention can also be applied to a vehicle headlamp in a case where the vehicle C is configured to travel on the right side.

In addition, in the first and second embodiments, when the swivel device 91 is established in an inactive state at an initial position, as shown in FIG. 13 and FIG. 14, there can be obtained light distribution patterns for low beams LLP and RLP on both of the left and right sides that overlap each other, and as shown in FIG. 14, there can be obtained light distribution patterns for high beams LHP and RHP on both of the left and right sides on which a majority of the right side and a majority of the left side overlap each other. However, in the present invention, there will be no limitation in particular as to the light distribution patterns for low beams LLP and RLP on both of the left and right sides and the light distribution patterns for high beams LHP and RHP on both of the left and right sides when the swivel device 91 is established in an inactive state at an initial position.

Still furthermore, in the first and second embodiments, the light distribution patterns for low beam LLP and RLP on both of the left and right sides, the light distribution patterns for high beam LHP and RHP on both of the left and right sides, and the light distribution patterns for shoulder edge beam LSP and RSP on both of the left and right sides are controlled so to be dimmed by means of the dimming control portion of the control portion 90. However, in the present invention, there may be a configuration in such a manner that an arbitrary light distribution pattern only is controlled so as to be dimmed from among the light distribution patterns for low beam LLP and RLP on both of the left and right sides, the light distribution patterns for high beam LHP and RHP on both of the left and right sides, and the light distribution patterns for shoulder edge beam LSP and RSP on both of the left and right sides without a need to control other light distributions to be dimmed, or alternatively, there may be a configuration in such a manner that there is no need to control dimming of all of the light distribution patterns.

Furthermore, in the first and second embodiments, the solenoids are used as shade switching devices 80 and 800. However, in the present invention, as the shade switching devices, there may be employed any device other than such the solenoids, such as a driving motor and a driving force transmission mechanism, for example, as long as it can function properly.

In addition, in the first and second embodiments, multifunctional light distribution patterns are distributed in a horizontal direction (in a transverse direction) by means of the swivel device 91. However, in the present invention, there may be a configuration in such a manner that there is no need to provide the swivel device 91, and such multifunctional light distribution patterns does not need to be distributed in the horizontal direction (in the transverse direction).

Further, in the first and second embodiments, the vertical axis V-V of the rotary shaft 93 of the swivel device 91 passes through a center or a substantial center of the lamp unit 2 for low beam. However, in the present invention, there may be a configuration in such a manner that the vertical axis V-V of the rotary shaft 93 of the swivel device 91 passes through a location other than the center or the substantial center of the lamp unit 2 for low beam.

What is claimed is:

1. A vehicle headlamp comprising:
    a lamp unit for low beam configured to emit forward of a vehicle a light distribution pattern for low beam;
    a lamp unit for high beam configured to emit forward of the vehicle a light distribution pattern for high beam;
    a shade that is disposed so as to be movable between a first location and a second location, and is configured to maintain the light distribution pattern for high beam when the shade is positioned in the first location and to form a light distribution pattern for shoulder edge beam in a state in which a part of the light distribution pattern for high beam is shaded when the shade is positioned in the second location; and
    a shade switching device configured to position the shade so as to be movably switchable between the first location and the second location,
    wherein each of the lamp unit for low beam and the lamp unit for high beam comprise a respective semiconductor-type light source and a reflector that has a reflection surface configured to emit forward of the vehicle the light from the semiconductor-type light source, the lamp unit for low beam configured to provide only the light distribution pattern for low beam, and the lamp unit for high beam configured to provide only the light distribution pattern for high beam and the light distribution pattern for shoulder edge beam.

2. The vehicle headlamp according to claim 1, wherein the lamp unit for low beam and the lamp unit for high beam are integrally configured so as to be rotatable around a vertical axis by means of a swivel device.

3. The vehicle headlamp according to claim 2, wherein the vertical axis of the swivel device passes through a center or a substantial center of the lamp unit for low beam.

4. A vehicle headlamp device comprising:
    the vehicle headlamp according to claim 1;
    a detecting portion configured to detect whether or not a preceding vehicle or an opposite vehicle forward of a driving vehicle exists; and
    a control portion configured to output a control signal to the semiconductor-type light source and the shade switching device or the semiconductor-type light source and the shade switching device and the swivel device, based on a detection signal from the detecting portion.

* * * * *